United States Patent [19]
Cox et al.

[11] Patent Number: 5,454,295
[45] Date of Patent: Oct. 3, 1995

[54] OVEN FOR BAKING PIZZA

[75] Inventors: Thomas L. Cox, Derby, Kans.; John D. Beltz, Louisville, Ky.; Donald L. Johnson, Jr., Haysville, Kans.; Johnny J. Pellin, Wichita, Kans.; Gary V. Riley, Wichita, Kans.; Randall J. Wiebe, Wichita, Kans.

[73] Assignee: Pizza Hut, Inc., Wichita, Kans.

[21] Appl. No.: 44,271

[22] Filed: Apr. 7, 1993

Related U.S. Application Data

[62] Division of Ser. No. 520,977, May 9, 1990, abandoned, which is a continuation of Ser. No. 166,206, Mar. 10, 1988, abandoned.

[51] Int. Cl.⁶ .................................................... A21B 1/00
[52] U.S. Cl. ........................... 99/332; 99/342; 99/443 C; 99/447; 126/21 A
[58] Field of Search ............................. 99/447, 445, 473, 99/475, 477, 476, 443 C, 325, 331, 332, 342; 126/21 R, 21 A, 19 R; 426/466, 523; 432/189, 194

[56]  References Cited

U.S. PATENT DOCUMENTS

| | | | |
|---|---|---|---|
| 3,908,533 | 9/1975 | Fagerstrom et al. | 99/447 |
| 4,338,911 | 7/1982 | Smith | 99/477 |
| 4,462,383 | 7/1984 | Henke et al. | 99/443 C |
| 4,474,498 | 10/1984 | Smith | 99/443 C |
| 4,556,043 | 12/1985 | Bratton | 99/447 |
| 4,576,090 | 3/1986 | Burtea | 99/443 C |
| 4,626,661 | 12/1986 | Henke | 99/443 C |
| 4,679,542 | 7/1987 | Smith et al. | 99/447 |

*Primary Examiner*—David A. Scherbel
*Assistant Examiner*—Reginald L. Alexander
*Attorney, Agent, or Firm*—Willian Brinks Hofer Gilson & Lione

[57] ABSTRACT

A method and an oven are disclosed which provide reduced baking times for pizza. The method includes the step of impinging the toppings portion of the pizza with jets of heated air. These jets of heated air have a velocity at the point of contact with the pizza sufficient to cause temporary displacement within the toppings portion. As a result, the time needed to properly bake the pizza is reduced. The oven includes means for impinging the toppings portion with jets of heated air at a velocity sufficient to cause temporary displacement within the toppings portion. The oven also preferably includes means for moving the pizza in relation to the jets of heated air. Preferably, the method is practiced and the oven is provided by modifying a commercially available pizza impingement/conveyor oven to produce the requisite heated air velocities.

14 Claims, 7 Drawing Sheets

OVEN FOR BAKING PIZZA

This is a divisional application of application Ser. No. 07/520,977, filed May 9, 1990, now abandoned, which is a continuation of application Ser. No. 07/166,206, filed Mar. 10, 1988, now abandoned.

BACKGROUND OF THE INVENTION

The present invention relates to the field of baking methods and apparatus. More particularly, the invention relates to the field of methods and ovens for baking pizza.

Historically, pizzas have been baked in deck ovens for a time sufficient to bake the crust and to bake, heat, and/or melt the ingredients atop the crust. Typically, the required bake times would be between 15 and 25 minutes per pizza.

In high volume pizza restaurants as well as in pizza delivery systems, it has been a goal to reduce the time needed to bake pizzas. In a restaurant setting, shorter bake times result in increased efficiency in using the available table space as customers would not have to wait as long for their pizza. Shorter bake times should also result in greater consumer satisfaction inasmuch as many customers do not want to wait any longer than necessary for their pizza to be served. Likewise, shorter bake times in a pizza delivery system result in increased efficiencies and customer satisfaction.

One improvement to the art of baking pizzas has been the development of the conveyor oven. Through the use of conveyor ovens, it has been possible to improve the consistency of baking, ease of operation and utilization of available floor space. Thus, conveyor ovens have become the industry standard for high volume pizza restaurants and pizza delivery systems.

Another improvement has been the development of impingement ovens for baking pizza. These ovens, which are a special type of forced convection oven using columnated heated air to impact the pizza, have increased heat transfer capabilities and therefore have reduced the bake time significantly. One example of such an impingement oven is described in U.S. Pat. No. 4,679,542 to Don Paul Smith.

These impingement ovens have achieved wide acceptance among pizza restaurants, and pizza delivery systems, especially those which deal with high volume and/or fast service. The typical bake time for the commercially available impingement ovens is in the range of 5 to 9 minutes.

SUMMARY OF THE INVENTION

Briefly stated, the present invention is a method and an oven for baking pizza. Both the method and the oven are designed to reduce the time needed for baking a pizza.

In accordance with the method aspect of the invention, the pizza includes a bottom portion comprising a crust and a layer of sauce, and further includes a toppings portion comprising at least cheese. The toppings portion is impinged with jets of heated air. The jets of heated air have a velocity sufficient to cause temporary displacement within the toppings portion. As a result, the time needed to properly bake the pizza is reduced.

In accordance with a preferred embodiment of this method, the velocity of the jets of heated air is sufficient to cause temporary and localized displacement with the toppings portion to such an extent so as to allow the jets of heated air to directly contact the bottom portion. Alternatively, the velocity is sufficient to reduce the thickness of the toppings portion between the jets of heated air and the bottom portion.

In accordance with the oven aspect of the present invention, the invention is an oven for baking pizza which includes means for impinging the toppings portion with jets of heated air having a velocity sufficient to cause temporary displacement within the toppings portion to thereby reduce the time required to bake the pizza.

In accordance with a preferred embodiment of the oven, the oven is an impingement conveyor oven such as that commercially available, which oven has been modified to produce jets of heated air of the requisite velocity. The preferred oven also includes either means for moving the pizza in relation to the jets of heated air, or means for moving the jets of heated air in relation to the pizza. The preferred oven further includes an energy saving system whereby the fan speed is increased to the optimum level in response to a pizza entering the oven and then reduced to an energy saving idling level after the pizza exits the oven.

The present invention provides the important advantage of reducing the time needed to properly bake a pizza. As will be discussed in detail below, experimental data has shown that the present invention can reduce the bake time of a particular type of pizza by as much as 38% in comparison with current designs. This reduction is particularly significant in view of the consumer demands noted above.

The invention also has the advantage that it can be utilized by making modifications to commercially available impingement ovens. Thus, the benefits of the invention may be realized by modifying currently owned impingement ovens as opposed to buying a new ones.

These and other advantages and features of the present invention will be better understood upon review of the following detailed description of the preferred embodiments read in conjunction with the accompanying drawings.

DETAILED DESCRIPTION OF THE PREFERRED EMBODIMENTS

As stated above, the object of the present invention is to provide a method and an oven capable of reducing the baking time for pizza. The present invention achieves this object by impinging the toppings portion of the pizza with jets of heated air which jets have a velocity sufficient to cause temporary displacement within the toppings portion.

Increasing the rate of air flow through an impingement oven has been expected to increase the rate of heat transfer and thus reduce the amount of time needed to properly bake a product. However, it has now been discovered that, when the velocity of the air impinging the top surface of the pizza exceeds a certain level, a reduction in baking time can be achieved which reduction is significantly greater than that which would have been expected. Observations of required baking times coupled with visual observations of the pizzas within the modified ovens have led to the discovery that this phenomenon is caused by the fact that these higher velocities of impingement have caused temporary displacement within the toppings layer. In other words, it was visually observed that, at the velocities which showed the marked reduction in baking time, the layer of cheese and other topping ingredients were being temporarily moved by the jets of heated air. The results of these tests are described below in connection with the examples.

Although the reasons why the present invention works are not completely understood, and while not wishing to be bound by any particular theory, it is currently believed that the present invention achieves the reduction in bake time by one or more of the following mechanisms.

By way of background, it is generally known that the top surface of the crust of a pizza is normally the last part of the pizza to be finished baking. This is true because, to reach this point in the pizza, heat must either migrate up from the bottom surface of the crust, or it must migrate down through the toppings ingredients. This migration of heat is slowed because the leavened bread product of the crust, and the cheese of the toppings layer have relatively poor coefficients of thermal conduction. This is exacerbated when cooking a relatively thick pizza product, such as the "Pan Pizza" sold by the assignee of the present invention, i.e. PIZZA HUT INC., because the thickness of both the crust and the toppings are increased in this type of product.

In light of these factors, it has been theorized that the present invention achieves the reduction in bake time by virtue of the fact that at the point on the pizza where the jets of heated air bear down on the top surface, it has been visually observed that the layer is pushed out of the way to some extent. As a result, the thickness of the cheese and other ingredients between the contacting end of the jet of heated air and the top surface of the crust is temporarily reduced at that point. It is believed that this temporary and localized reduction in the thickness of the layer allows for faster heat transfer to the top surface of the crust. As mentioned above, the top surface of the crust is typically the hardest part of a pizza to bake. Thus, getting faster heat transfer to this point reduces the time necessary for proper baking of the total pizza.

A second proposed theory which is closely related to the first involves the fact that when a particular velocity is achieved, the cheese and sauce can be temporarily parted to thereby expose the top surface of the crust to direct contact with the jets of heated air. Alternatively, the jets of heated air directly contact the layer of sauce atop the crust, which sauce has a higher coefficient of thermal conduction than the toppings layer. Thus, whether the jets of heated air contact the sauce or the crust itself, heat is transferred more quickly to the top surface of the crust, thus increasing the heat transfer rate to this part of the pizza and reducing the required baking time. Another way of expressing this second theory, is as a subset of the first theory. That is, the thickness of the layer is reduced to zero at the point and at the time of contact by the heated air jet.

A third theory which has been proposed to account for this greater than expected reduction in the bake time for pizzas involves the fact that, as the jets of heated air cause temporary displacement within the toppings portion, the surface area of contact between the jets and the pizza is increased. In other words, as the jets impinge the toppings portion and make temporary craters in the toppings layer, the jets come into contact with a greater surface area of the pizza. This greater surface area of contact leads to faster heat transfer from the jets to the pizza.

As stated above, these three mechanisms are at present only theorized. The contribution of any one of these proposed mechanisms is not known. It is also not known whether there are any other mechanisms that come into play. However, the important fact is that a significant reduction in required baking time for pizza has been observed when the velocity of the impingement on the top surface of the pizza is sufficient to cause temporary displacement in the cheese and sauce layer.

The preferred manner of implementing the present invention is by the modification of a commercially available conveyor impingement oven system. In particular, the preferred embodiments involve modifications to a commercially available impingement oven system to thereby increase the velocity of impingement on the top surface of the pizza above the point at which temporary displacement within the toppings portion occurs. In particular, the oven system which has been modified in the most preferred embodiment is an oven system made and sold by the Middleby Marshall Co. of Morton Grove, Ill. A commercially available model is sold under the designation "Model PS 360.S". This Model is designated with the suffix "s" because it is equipped with "super fingers" The assignee of the present invention has purchased several of these particular oven systems. It is this Model PS 360.S which has served as the starting point for the most preferred embodiment of the present invention.

Figure 1:
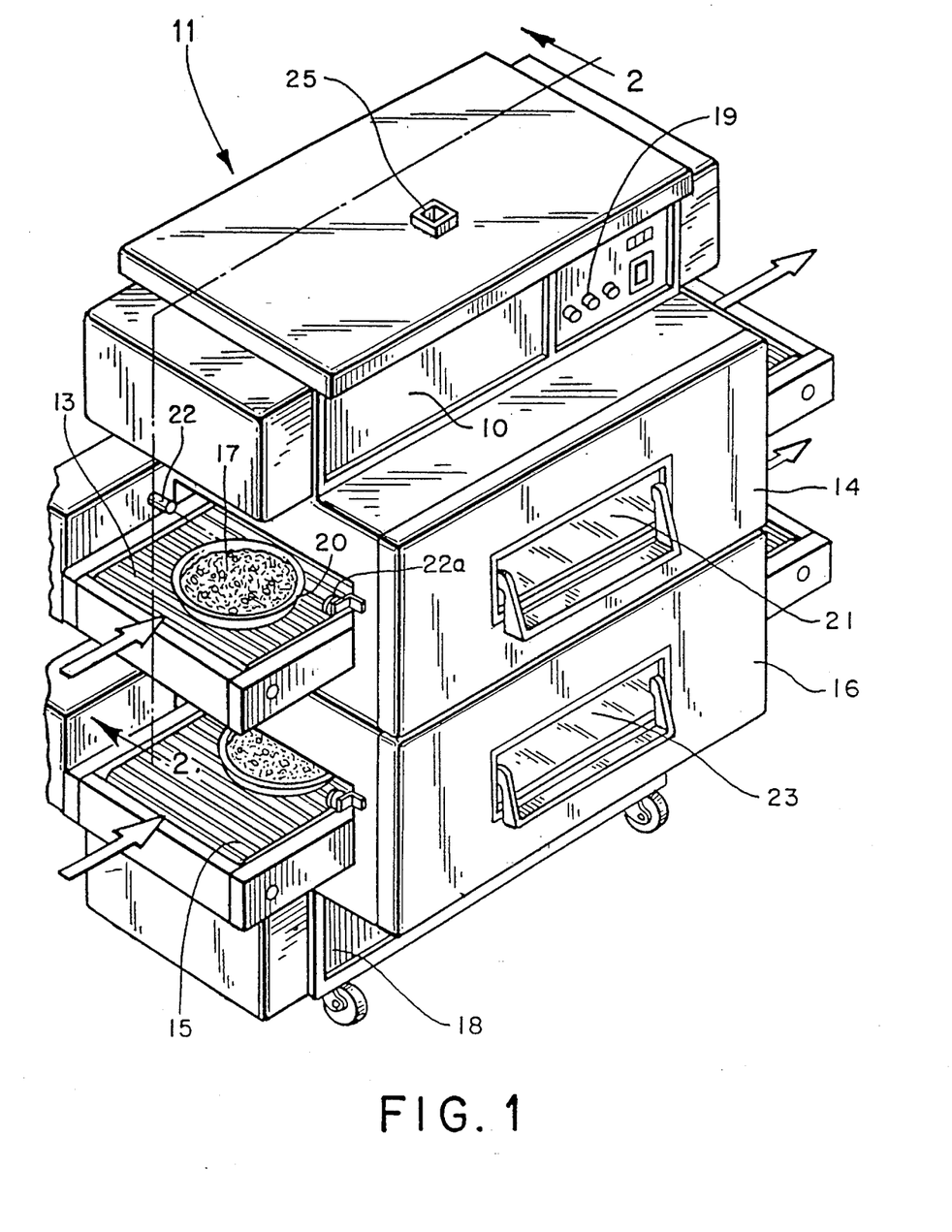
FIG. 1 is a perspective view of a commercially available conveyor impingement oven system which has been modified according to a preferred embodiment of the present invention.

Referring to the drawings, FIG. 1 is a perspective view of the Model PS 360.S oven system 11 modified according to the most preferred embodiment. Because, most of the modifications are made inside the oven system, the appearance of the outside is quite similar to the original oven system as received from the Middleby Marshall Co. One difference is that because of an increase in the size of the fan motors, the upper mechanical cabinet 10 extends out about 5 inches on both sides past the upper oven cabinet 14. Likewise, the lower mechanical cabinet 18 extends the same distance on both sides past the lower oven cabinet 16.

One other change made on the outside of the oven system 11 is two photodetector 22 and 24 which are attached above the top and bottom conveyor respectively. These photodetectors are used in an energy saving component which will be described in detail below in connection with FIG. 11.

As shown, this oven system 11 is actually a double oven. Double oven systems are popular because they give a pizza restaurant and/or delivery system the flexibility to load shed by using both ovens at peak times and using only one at non-peak times. In addition, the double oven gives the flexibility of baking at two different temperatures and for two different times, e.g. by adjusting the speed of each conveyor.

The double oven system 11 includes a top conveyor 13 which moves a pizza 17 in a pan 20 through the upper oven 14 as well as a bottom conveyor 15 which moves a pizza through the bottom oven 16. The top mechanical cabinet 10 houses the burner, fans, and motors for the top oven 14 while the bottom mechanical cabinet 18 houses the burners, fans, and motors for the bottom oven 16.

For the sake of convenience, only the top oven has been depicted in the remaining figures. The bottom oven is basically a mirror image of the top oven with the exception that, since the pizza must remain upright, the conveyor is oriented the same as in the top oven.

On the front of the oven near the top is a set of typical controls and indicators 19 including switches for the blower, conveyor, and heat systems, and indicators for the bake temperature, and conveyor time. Also, a cooling air exhaust 25 is included on top of the mechanical cabinet 10.

Figure 2:
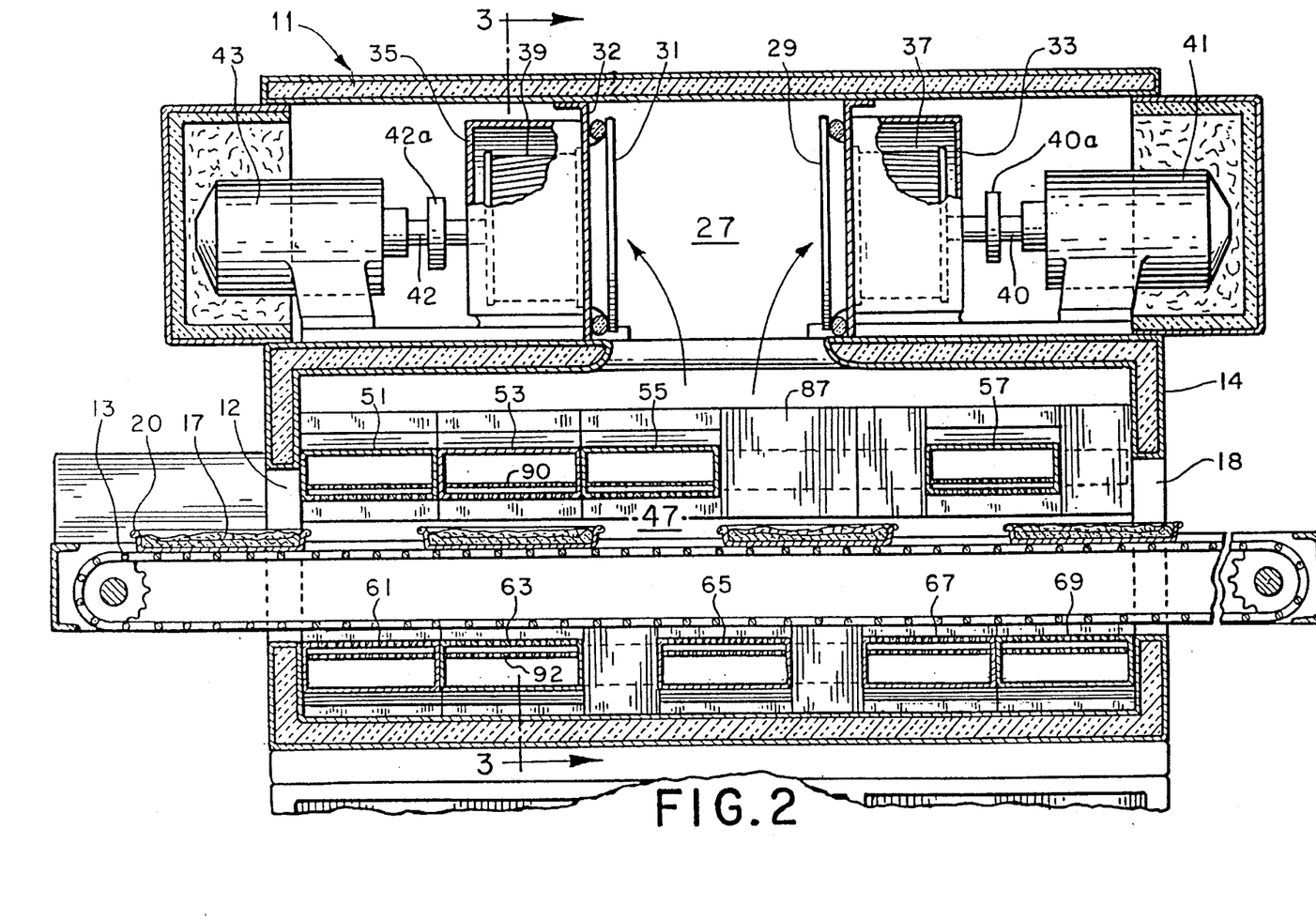
FIG. 2 is a cross-sectional view taken along line 2—2 of FIG. 1.

Referring now to FIG. 2, which is a vertical cross-section of the upper oven of the oven system 11, it is seen that the conveyor moves the pizza 17 through the entrance 12, through the baking chamber 47 and out the exit 18.

Air is drawn from the baking chamber 47 into the return air plenum 27 by the forward curve blower wheels 37 and 39. Before entering the return air plenum, the air is heated by a gas burner (not shown). The fans 37 and 39 are enclosed within a volute 33 and 35 respectively and are driven by electric motors 41 and 43 respectively via shafts 40 and 42 respectively. Slingers 40a and 42a are attached to each shaft for the purpose of dissipating heat from the motor shafts.

One change that has been made to the Model PS 360.S is that more productive fans 37 and 39 have replaced the original fans. Most preferably, the fans are obtained from REVCOR, INC. under the Part No. R912-400S. These are dynamically balanced blower wheels which are 9 and ⅛" in diameter and 4" wide.

Another change is that the original motors have been replaced with faster, more powerful motors. In particular, the motors used in the depicted embodiment were obtained from Century Electric, Inc. with the part No. 8-353624-01. These motors are rated for 3 h.p. and 3450 r.p.m. continuous service. For comparison, the original motors were rated for ⅓ h.p. and 1750 r.p.m. continuous service. The shafts 40 and 42 of these new motors are slightly larger than those originally provided with the Model PS 360.S oven. The original slingers 40a and 42a can be used if bored to the appropriate diameter and dynamically balanced.

Still another change that has been made to the Model PS 360.S is that the shape of the volutes 33 and 35 together with the position of the fans within the volutes have been modified to allow greater air throughput for the fans.

Figure 4:
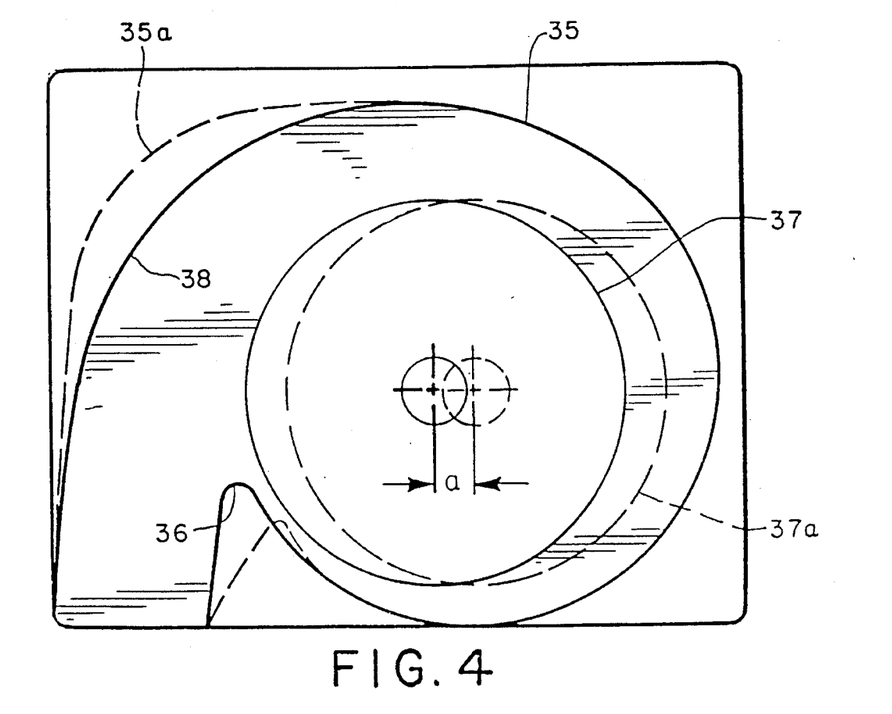
FIG. 4 is a schematic view of the fan and volute as modified with the original design shown in dashed lines.

FIG. 4 schematically shows the original shape of the volute 35a and the original position of the fan 37a both in dashed lines where they depart from the modified design. The current shape and position are shown in the solid lines. As can be seen, the fan 37 has been moved a distance "a" closer to the rear plenum entrance. Most preferably, the fan is moved 0.75" closer to the rear plenum entrance. In this position there is greater distance between the fan 37 the front side of the volute 35 than existed in the original design, thereby increasing the total airflow through the fan. The tongue 36 has been extended and reshaped and the volute has been reshaped in the throat region 38 to provide a more spiral shaped volute, and therefore produce increased air flow.

Yet another change which has been made to the Model PS 360.S has involved the size and placement of the inlet cones 29 and 31. These inlet cones are the orifice through which the recirculated heated air passes through the wall 32 of the return air plenum 27 into the respective fan chambers.

Figure 5:
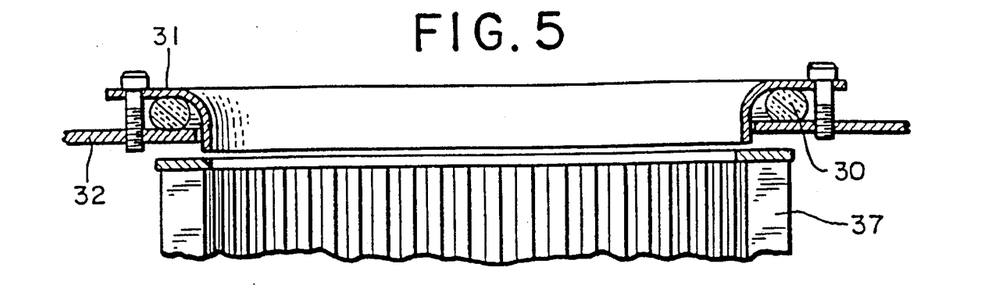
FIG. 5 shows the modification to the inlet cone of the present invention.
Figure 5A:
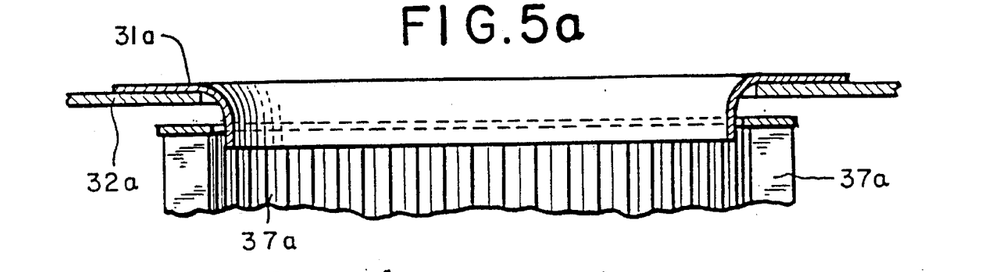
FIG. 5a shows the design of the inlet cone on a commercially available conveyor impingement oven before being modified in accordance with the preferred embodiment.
Figure 6:
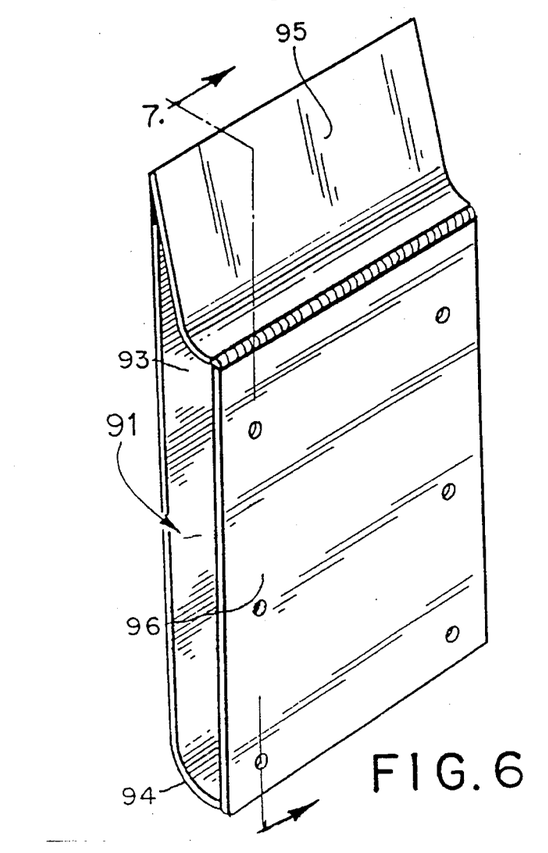
FIG. 6 is a perspective view of an air scoop made according to the preferred embodiment.
Figure 7:
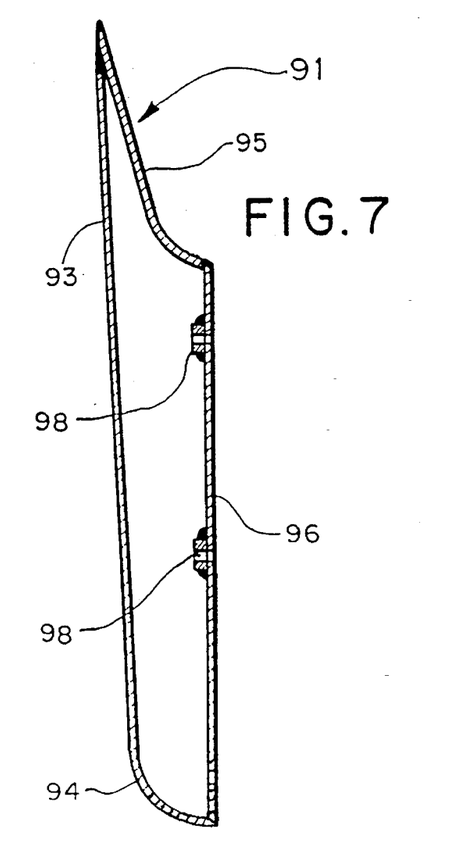
FIG. 7 is a cross-sectional view taken along line 7—7 of FIG. 6.

FIG. 5 shows the new inlet cone 31 to fan 37 orientation while FIG. 5a shows the original inlet cone 31a to fan 37a orientation on the Model PS 360.S. By comparison of the two drawings, it is seen that the new design in FIG. 5 has a larger inlet cone 31. In particular, the diameter of the new inlet cone is 7.6875" whereas the original inlet cone 31a had a diameter of 7.25". It is also shown that the inlet cone 31 of the new design does not extend into the fan 37 as does the inlet cone 31a of the original design. The inlet cone 31 is held in this position by the rope gasket 30 which fits between the inlet cone and the plenum wall 32. These changes have likewise been observed to increase the air flow through the fans.

Figure 3:
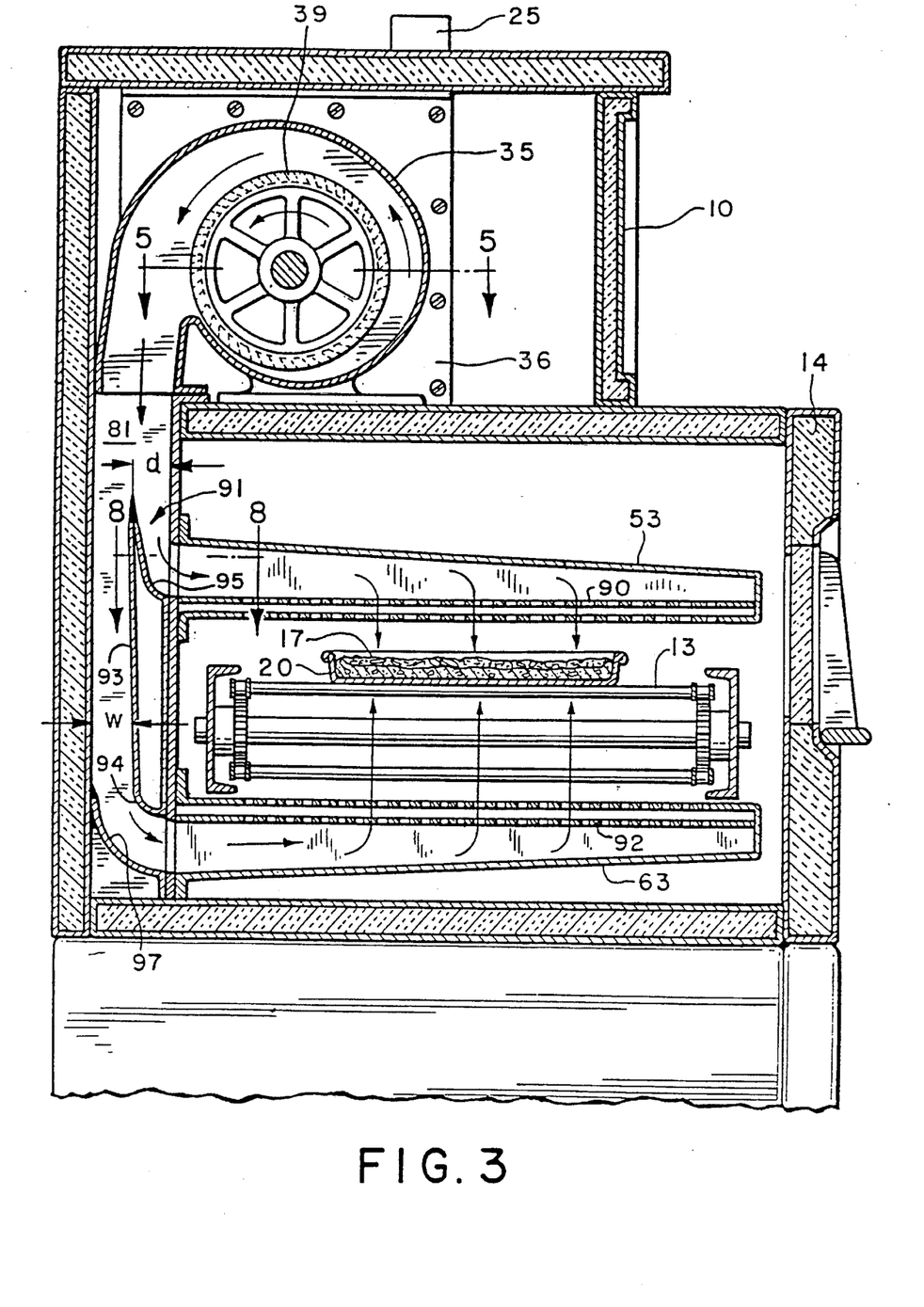
FIG. 3 is a cross-sectional view taken along line 3—3 of FIG. 2.

Referring now to FIGS. 2 and 3, it is seen that the volute 33 and 35 discharge impelled heated air into a rear plenum 81. Communicating with the rear air plenum is a set of upper ducts 51, 53, 55, and 57, as well as a set of lower ducts 61, 63, 65, 67, and 69. These ducts function to bring the heated air over and under the pizza as it passes through the baking chamber 47. In the industry, these ducts are commonly called "fingers". The specially designed fingers used in the Model PS 360.S are commonly called "super fingers".

As best seen in FIG. 2, these fingers are attached to the top and bottom exit of the rear plenum at particular positions along the path of the conveyor. In particular, the top exit and bottom exit for the rear plenum of the Model PS 360.S are each equipped with a track into which the fingers are slid and positioned. The top and bottom tracks have space for 6 super fingers. Spacing blanks 87 can be used to take the position of a finger. The most preferred embodiment includes 4 fingers on the top and 5 fingers on the bottom.

The preferred positioning for these fingers is best shown in FIG. 2. As shown, the top 4 fingers are positioned so that the first three fingers 51, 53, and 55 are attached adjacent to each other at the left side of the top track, i.e. at the start of the conveyor's path through the oven. The fourth finger 57 is spaced a finger width and a half further along the path, i.e. a half finger width away from the end of the conveyor's path.

The bottom fingers are positioned with two fingers 61 and 63 adjacent to each other at the left of the oven. The third finger 65 is spaced a half finger width further along so as to be in the center of the track. The fourth and fifth fingers 67, and 69, are adjacent each other at the end of the conveyor's path, that is a half finger space away from the third finger 65.

Each of the top fingers includes a columnating plate 90 (see FIG. 3a) which is perforated and includes an array of orifices 54 that function to begin the formation of a columnated jet of heated air. The bottom surface of each of the top fingers includes an identical array of orifices. Upon passing through the orifices in the columnating plate 90 and then through the orifices in the finger, the heated air is formed into a column or jet for impinging the toppings portion of the pizza.

Figure 10:
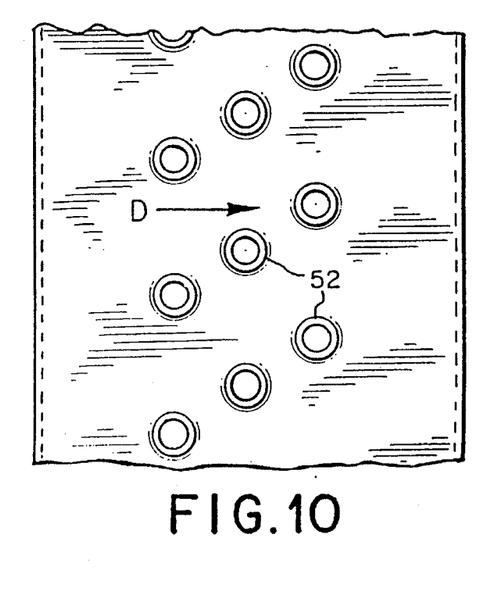
FIG. 10 is a schematic view showing the array of orifices for the top impingement fingers.

FIG. 10 is a schematic representation of the most preferred placement of these orifices 52 in the top fingers 51, 53, 55, and 57. As shown, the orifices are set in an array of diagonal rows of three. Each top finger includes 45 such orifices. The direction of pizza travel is shown by arrow D. Most preferably, these orifices are 0.375" in diameter.

Figure 9:
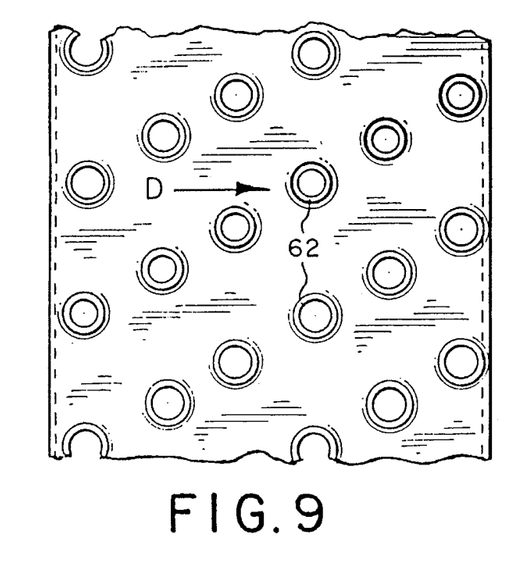
FIG. 9 is a partial schematic view showing the array of orifices for the bottom impingement fingers.

In similar fashion, each of the bottom fingers includes a columnating plate 92. As with the top fingers, each columnating plate and top surface of each bottom finger includes an identical array of orifices. FIG. 9 is a schematic representation of the placement of the orifices 62 in the bottom fingers 61, 63, 65, 67, and 69. As shown, the orifices in the bottom fingers are set in an array of diagonal rows of 6. Each bottom finger and bottom columnating plate includes 90 orifices. The direction of pizza travel is shown by arrow D. These bottom orifices are also most preferably 0.375" in diameter.

Figure 3A:
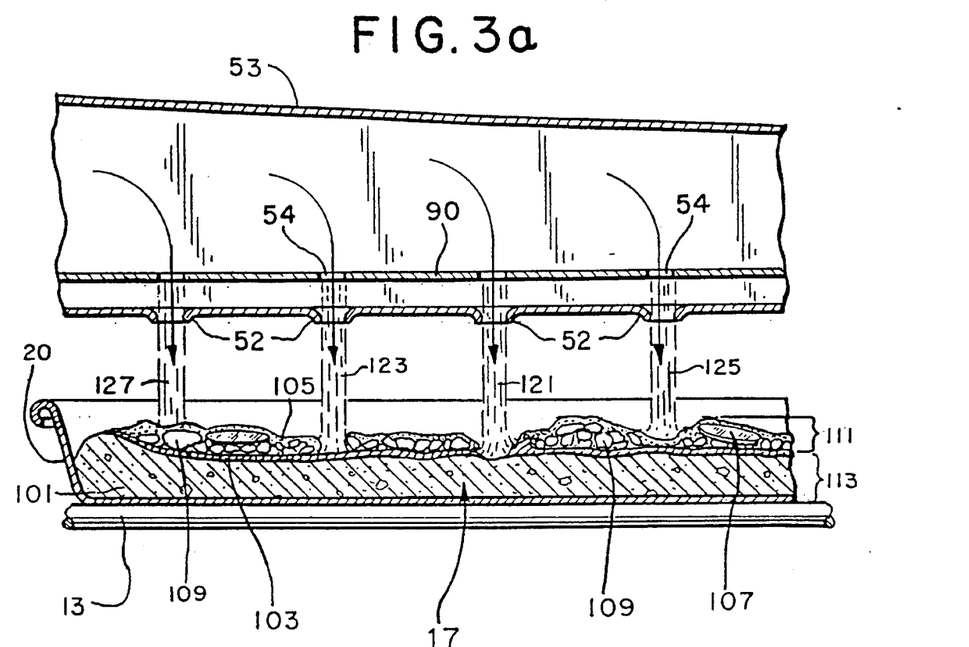
FIG. 3a is an enlarged portion of FIG. 3 showing the action of the jets of heated air on the pizza.

As seen in FIG. 3, these fingers are used to direct impelled heated air over and under the pizza. The jets of heated air leaving the bottom fingers contact the bottom of the pan 20. The jets of heated air leaving the top fingers contact the top of the pizza 17, i.e. the toppings portion. A magnified view of this impingement of the toppings portion is shown in FIG. 3a.

As shown in FIGS. 3, 6, 7, and 8, another important modification to the Model PS 360.S oven system is the inclusion of air scoops in the rear plenum 81 for the purpose of increasing the air flow to the top fingers. In particular, these scoops are attached in the rear plenum adjacent the entrance for the top fingers, extend out into the rear plenum, and include a curved surface for directing air into the top fingers. Each air scoop 91 includes a curved plate 95. Below the curved plate 95 is a back plate 93. Each back plate 93 extends below the curved plate 95 to allow for a gradual increase in the plenum width w in the rear plenum 81 below the curved plate, which facilitates a continuous gradual transition of the air flow into the bottom finger 63. Near the bottom of the back plate 93 is a curved portion 94 which allows a smooth transition into the bottom fingers. Each air scoop also includes a base plate 96 for attaching the scoop to the wall of the rear plenum.

The original Models 360 and PS 360.S, do not include air scoops for directing air into the fingers. Instead, a plenum baffle, i.e. a simple 1 and 5/8" wide horizontal plate, was attached at the same point in the rear plenum. The addition of air scoops has been found to increase the velocity of air flowing into each of the top fingers. In addition, because the air scoops cause a reduction in turbulence within the rear plenum, the velocity of air flowing into each of the bottom fingers is increase as well.

Figure 8:
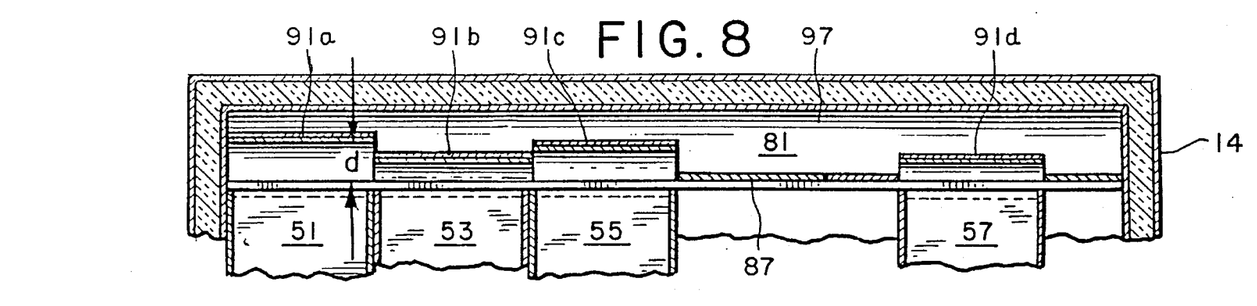
FIG. 8 is a horizontal cross-sectional view taken along line 8—8 of FIG. 3 showing the placement of the air scoops in the rear plenum.

The distance designated d in FIG. 3 is the distance which the curved portion 95 extends out into the rear plenum. FIG. 8 is a horizontal cross section through the rear plenum illustrating how the distance d for each of the air scoops 91 can be altered. Changing this distance will affect the amount of air which is fed into each of the top fingers. Accordingly, adjustments can be made to achieve the most desirable distribution of the air between each of the top fingers and between the top and the bottom fingers. At present the most preferable arrangement is for the air scoop 91a feeding the first top finger 51 extends about 2 and 13/16 into the rear plenum. Air scoop 91b extends about 2 and 1/4 into the rear plenum. Air scoop 91c extends about 2 and 5/16" into the rear plenum. Air scoop 91d extends about 2 and 1/4" into the rear plenum.

Referring to FIG. 3, yet another modification of the oven system is seen at the bottom of the rear plenum 81. In particular, a curved bottom plate 97 has been added to the bottom of the plenum 81 to direct the impelled air into the bottom fingers 63. This curved plate 97 thus functions somewhat similarly to the air scoops 91 in that both allow for a smooth transition for the heated air between the rear plenum and the fingers. This is believed to reduce the turbulence in the rear plenum and back pressure on the fans and thereby to increase the flow of air through the top and bottom fingers. In particular, the reduction of turbulence and back pressure allows for faster air flow through the entire oven.

Referring to FIG. 3a, the jets of heated air which contact the toppings portion 111 of the pizza should be at a velocity sufficient to cause temporary displacement within the toppings portion 111 which sits on top of the bottom portion 113. The toppings portion 111 will comprise at least cheese 105. Preferably, the toppings portion will also comprise other pizza topping ingredients such as chunks of sausage 109 and slices of pepperoni 107. Other meats, vegetables, and fruits can also be present in the toppings portion 111. The bottom portion will include the crust 101 and sauce 103.

As shown, when the jets of air have the requisite velocity, the toppings portion layer 111 is temporarily displaced. In some instances, such as that shown with jet 121, the toppings are pushed away to the extent that the top surface of the crust 101 is exposed to direct contact with the jets of heated air.

In other instances, such as that shown with jet 123, the toppings are pushed away to expose the layer of sauce 103. Since the sauce has better thermal conduction properties than the cheese, direct contact with the sauce leads to faster thermal transfer to the crust 101.

In still other instances, such as that shown with jet 125, the toppings portion is not pushed away completely, but the thickness of the layer is reduced so that the transfer of heat through the layer into the crust is increased.

In still other instances, the jet 127 may contact an immovable object such as a slice of pepperoni 107, or a chunk of sausage 105. However, the net effect of the displacement that does occur is a reduction in the time required to bake the pizza.

As stated above, the velocity of the jets of heated air should be sufficient to cause temporary displacement within the toppings portion. In the Examples below, velocity measurements have been taken at each of the orifices in the top fingers. In particular, measurements of the pressure differential have been taken and converted into a velocity value in feet per minute (fpm). The velocities for all of the orifices in the top fingers have been averaged and reported below. Typically, the lowest velocity measured on a top finger orifice is about 80% of the average top finger velocity, while the highest is about 130% of the average.

Based on the Examples below, it is preferred that the jets of heated air exiting the top fingers have an average velocity of at least above about 6,600 fpm. More preferably, the jets should have a velocity between about 6,600 and about 8,500 fpm. Most preferably, the jets should have a velocity between about 6,900 and about 8,100 fpm.

In general, the minimum velocity is that which will result in temporary displacement in the toppings portion. The maximum value is that above which disfigurement of the pizza occurs. In other words, it is important to keep the velocity below that point at which the displacement within the toppings portion becomes more than temporary, e.g. by blowing topping ingredients off the top of the pizza.

An advantage of the present invention is that it requires no alteration in the formulation or construction of the pizza to be cooked. Moreover, the present invention can be used with standard pizza pans. However, it is contemplated that alterations could be made in these areas to thereby expand the range of usable velocities.

For example, it has been found to be desirable when preparing a pan pizza for baking in the most preferred method of the invention to press slightly on the top of the shell of pizza dough after it has been proofed in the pan, and before the ingredients are assembled thereon. This pressing step is used to expel $CO_2$ from between the bottom of the shell and the pan, which $CO_2$ was generated during proofing of the shell. If the $CO_2$ is not expelled, it is believed to reduce the rate of the rate of thermal transfer between the pan and the bottom of the crust during baking. This pressing step is best accomplished by providing a cylinder with a diameter about ¾" smaller than the inside diameter of the pizza pan.

Another example of a modification to better utilize the benefits of the invention, involves the use of perforated pans. Perforated pans are well known in the pizza baking art. It has been found to be preferable to cook a thin pizza in such a perforated pan in the method and oven of this invention.

It is important to note that not all of the jets of heated air are required to possess the velocity sufficient to cause displacement in the toppings portion. That is, although it is preferable that all of the jets possess the requisite velocity, the invention is operative if only some of the jets in the oven cause temporary displacement. Thus, it should be born in mind when interpreting the specification and appended claims, that, unless otherwise indicated, the velocity values provided are for those jets which do cause displacement in the toppings layer.

Figure 11:
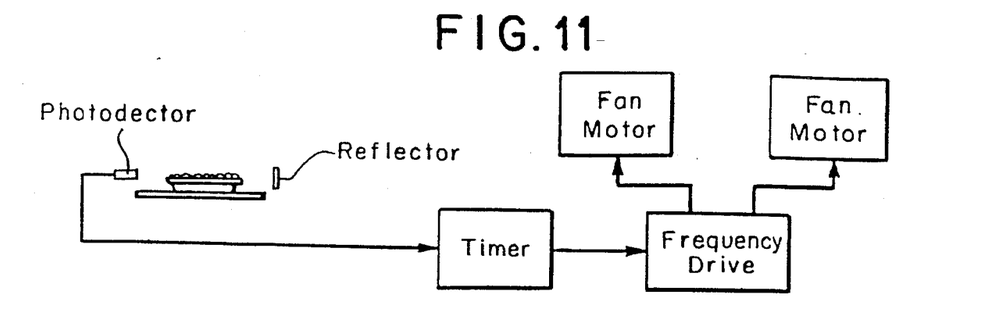
FIG. 11 is a schematic diagram of the energy saving system employed in the most preferred embodiment.

FIG. 11 is a schematic diagram showing the components of the energy saving system which has been incorporated into the most preferred embodiment. Because the fans for the oven of the most preferred embodiment will use more electrical power, it has been found desirable to equip the oven with a system which can decrease the power consumption of the fan motors when the oven is not actually baking a pizza.

This objective has been accomplished by using a photodetector located at the entrance to the oven. The photodetector senses when a pizza is moving into the oven and thereupon a signal is sent to an electronic timer which in turn sends a signal to a frequency controller which in turn increases the frequency of the electric power to the fans to that level which is needed to achieve the desired jet velocity. The electronic timer measures a time period sufficient for the pizza to travel through the oven. At the end of this time period, the frequency drive decreases the frequency of the electric power to the fan motors to the normal idling level. Naturally, if pizzas are continually put on the conveyor, the timer is continually reset and the power to the fan motors will be maintained at the baking level.

In accordance with the most preferred embodiment, the photodetector is a reference 120 VAC dark photoswitch sold by the Electronics Corp. of America under the Part No. 42 SRU-6005 used with a reflector having a Part No. 92-39.

The electronic timer is sold by Allen-Bradley with the Part No. 700-RTA00V100A1. The frequency drive is also sold by Allen-Bradley and has the Part No. 1333-CAA.

EXAMPLES

The following examples of the invention together with comparative examples are provided by way of explanation and description only.

Figure 12:
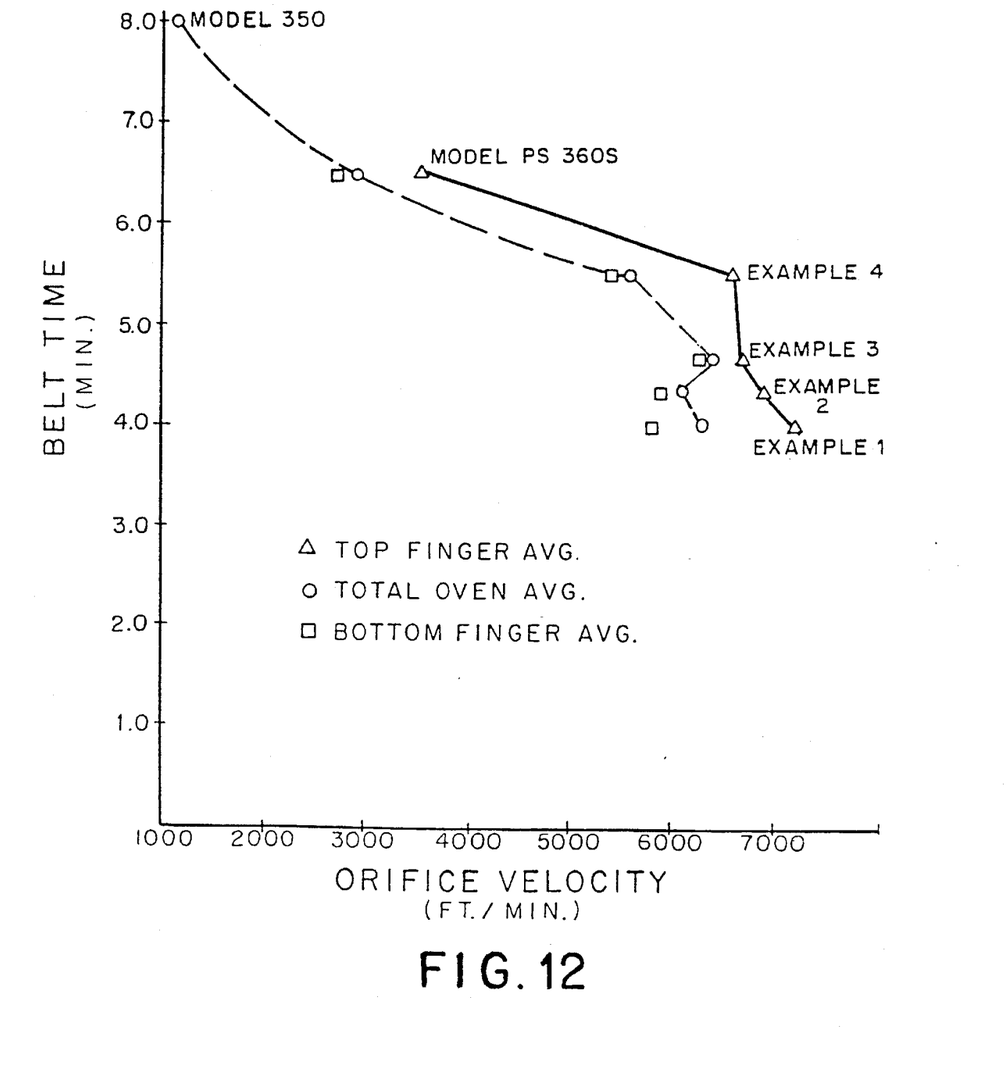
FIG. 12 is a graph showing the reduction in baking time realized by the present invention.

The data from these examples is shown in the graph of FIG. 12. In particular, the average cook time was plotted against the average velocities for the jets from the top and bottom fingers, along with the average velocities of all of the jets.

With the exceptions noted, Example 1 was performed according to the most preferred embodiment of the present invention. In particular, the Example was performed with a Model PS 360.S oven modified as described above with the substitution of the larger fans and fan motors, the redesign of the inlet cone, and the addition of air scoops for the top fingers and a curved bottom plate for the bottom fingers. The fan was repositioned rearward within the volute as shown in FIG. 4. However, in this Example, the volute was not reshaped as shown in FIG. 4. Accordingly, the volute was shaped as shown by the dotted lines in FIG. 4. Also, the back plate of the air scoops in this particular oven did not extend vertically below the curved plate, but rather sloped back toward the front surface of the rear plenum. One further difference between the oven used in this Example and that described above, is that there were only 3 top fingers. The placement of these 3 top fingers is as follows: The first finger was ½ space from the beginning of the track, the second finger was adjacent to the first, and the third finger was 2 full spaces away from the second, i.e. ½ space from the end of the track.

The velocity of the jets exiting the fingers of this oven were measured individually by covering each orifice with a self-centering Pitot tube which was connected to an electronic differential pressure cell which generated a pressure value in $H_2O$. Velocity values in feet per minute were obtained by use of the following formula:

$$V = .2 \, P/D$$

where: V= orifice velocity in feet per minute

P=flow pressure in $H_2O$

D=fluid density of the air at the baking chamber temperature.

In each of these Examples, the velocity of each finger was so measured. An average of the top orifices, an average of the bottom orifices and the average of all of the orifices was calculated.

In Example 1, the average velocity of the heated air jets exiting the top finger orifices was 7,200 feet per minute (fpm). The average velocity for the bottom fingers was 5,800 fpm. The average for all of the orifices was 6,300 fpm. At present, this is the most preferred velocity for the top orifices.

Some 16 pizzas were cooked in the oven of Example 1 to evaluate its minimum acceptable bake time. Table 1 includes the data obtained from these bakes.

TABLE 1

| PRODUCT | BELT TIME | T° BAKE | T° MIN. | T° AVE. | CRUST | CHEESE | BOTTOM | DOUGH DONENESS |
|---|---|---|---|---|---|---|---|---|
| MPSS | 4:00 | 520 | 156 | 166 | 0 | 0 | −1 | 0 |
| MPS | 4:00 | 520 | 160 | 170 | −1 | 0 | −1 | 0 |
| LPSS | 4:00 | 525 | 148 | 154 | 0 | 0 | 0 | 0 |
| SPSS | 4:00 | 530 | 159 | 165 | 0 | 0 | 0 | 1 |
| MPS | 4:00 | 530 | 164 | 167 | 0 | 0 | 0 | 0 |
| LPSS | 4:00 | 530 | 154 | 165 | 0 | 0 | 0 | 0 |
| MPS | 4:00 | 535 | 158 | 166 | 0 | 0 | 0 | 0 |
| SPSS | 4:00 | 535 | 153 | 165 | 0 | 0 | 0 | 5 |
| LPSS | 4:00 | 535 | 149 | 160 | 0 | 0 | 0 | 1 |
| MPSS | 4:00 | 535 | 145 | 155 | 0 | 0 | 0 | 0 |
| SPS | 4:00 | 535 | 152 | 160 | +1 | 0 | +1 | 0 |
| MPS | 4:00 | 535 | 160 | 170 | 0 | 0 | 0 | 0 |
| MPS | 3:40 | 540 | 146 | 157 | 0 | −1 | 0 | 0 |
| MPS | 3:30 | 550 | 158 | 165 | −1 | 0 | 0 | 0 |
| MPS | 3:30 | 550 | 156 | 167 | 0 | 0 | 0 | 0 |
| MPS | 3:30 | 550 | 149 | 156 | −1 | 0 | 0 | 1 |

By way of explanation of this table and the tables to follow, each of the pizzas cooked in this and the following examples was a standard product of PIZZA HUT, INC. (PHI). The abbreviations are shown below with their full product name, diameter, toppings weight (including cheese), cheese weight toppings thickness, crust weight and crust thickness.

| | PRODUCT DESCRIPTION | | | | | |
|---|---|---|---|---|---|---|
| Abbrev. | Product Name | Diam. | Topping Wt. | Topping Thickness | Crust Wt. | Crust Thickness |
| SPS | "Small Pan Supreme" | 9" | 9 oz. | ¼" | 9 oz. | ½" |
| SPSS | "Small Pan Super Supreme" | 9" | 9.5 oz. | ¼" | 9 oz. | ½" |
| MPS | "Medium Pan Supreme" | 12" | 18 oz. | ½" | 16 oz. | ½" |
| MPSS | "Medium Pan Super Supreme" | 12" | 19 oz. | ½" | 16 oz. | ½" |
| LPSS | "Large Pan Super Supreme" | 15" | 28.5 oz. | ¾" | 25 oz. | ½" |
| LPS | "Large Pan Supreme" | 15" | 27 oz. | ¾" | 25 oz. | ½" |
| MTCH | "Medium Thin Cheese" | 12" | 11 oz. | ¹⁄₁₆" | 10 oz. | ⅛" |
| LPPMIS | "Large Pan Pork, Mushrooms, Italian Sausage" | 15" | 27 oz. | ¾" | 25 oz. | ½" |

The belt time is measured as the time between when the leading edge enters the baking chamber and when the leading edge exits the baking chamber.

The bake temperature was that indicated on the oven.

A temperature probe was used to measure the temperature at the interface between the crust and the toppings portion immediately after baking. The probe was inserted in 5 to 7 spots within the center half of the pizza. The average temperature is reported in the table as well as the minimum temperature observed. The average temperature should be above 160° F.

The baked pizzas were evaluated as to appearance. In particular, the color of the cheese, the top of the crust, and the bottom of the crust were each compared to standard PHI scales. On these scales, 0 indicates no variance from the optimum color. A rating between 2 and −2 is considered acceptable.

The interface dough characteristics were also observed for each of these pizzas. The following scale was used for rating the doneness of the dough at the top surface of the crust. A rating of 0, 1, 2 or 5 is considered acceptable on this test.

| Rating | Interface Dough Characteristics |
|---|---|
| 0 | 100% completely baked dough shell |
| 1 | 90–99% baked, 1–10% marginal dough |
| 2 | 75–89% baked, 11–25% marginal dough |
| 3 | 50–74% baked, 26–50% marginal dough |
| 4 | 0–49% baked, 51–100% marginal dough |
| 5 | 90–99% baked or marginal, 1–10% raw dough |
| 6 | 75–89% baked or marginal, 11–25% raw dough |
| 7 | 50–74% baked or marginal, 26–50% raw dough |
| 8 | 0–49% baked or marginal, 51–100% raw dough |

Product disfigurement was observed for these pizzas. The following scale was used for this rating. A rating of 0 to 2 is considered acceptable for this parameter.

| Rating | Appearance Characteristics |
|---|---|
| 0 | no appearance changes |
| 1 | slight toppings movement/no displacement onto rim |
| 2 | moderate toppings movement/0-10% rim coverage |
| 3 | moderate toppings movement/11-25% rim coverage |
| 4 | substantial toppings movement/26-50% rim coverage |
| 5 | excessive toppings movement/51-100% rim coverage |

The products baked in Examples 1-4 all had product disfigurement ratings of 0-2.

As seen in Table 1, the 12 pizzas that were cooked at 4 minutes belt time all had acceptable values. Accordingly, the oven with these modifications was approved for use at 4 minutes.

Example 2 was carried out the same as Example 1 except that the inlet cones for the fans were not changed from the original design. The average measured velocities for the orifices in the top fingers for this oven was 6,900 fpm. The average measured velocities for the orifices in the bottom fingers was 5,900 fpm. and the average measured velocities for all of the orifices was 6,100 fpm. Some 18 standard PHI pizzas were cooked in this oven and rated as described above. The results for this oven are shown in Table 2 below.

time did not have acceptable internal temperatures or dough doneness values. Accordingly, it was determined that this oven so configured had an acceptable bake time of 4 minutes and 20 seconds.

Example 3 was performed the same as Example 2 except that the fan was not repositioned within the volute. In other words, the oven of this example included the larger fan motors and fans, the air scoops, and the curved bottom plate as described above. The average measured velocities for the orifices in the top fingers for this oven was 6,700 fpm. The average measured velocities for the orifices in the bottom fingers was 6,300 fpm. and the average measured velocities for all of the orifices was 6,400 fpm. Some 15 standard PHI pizzas were cooked in this oven and rated as described above. The results for this oven are shown in Table 3 below.

TABLE 2

| PRODUCT | BELT TIME | T° BAKE | T° MIN. | T° AVE. | CRUST | CHEESE | BOTTOM | DOUGH DONENESS |
|---|---|---|---|---|---|---|---|---|
| MPS | 4:00 | 520 | 148 | 155 | +3 | +4 | +1 | 0 |
| MPS | 4:00 | 520 | 152 | 157 | +3 | +3 | +1 | 0 |
| LPPMIS | 4:00 | 520 | 138 | 148 | +1 | +2 | 0 | 6 |
| MTCH | 4:00 | 515 | — | — | +1 | +3 | 0 | — |
| MTCH | 4:00 | 515 | — | — | 0 | 0 | 0 | — |
| SPSS | 4:00 | 515 | 124 | 133 | +1 | +3 | +1 | 8 |
| MPS | 4:00 | 515 | 149 | 156 | 0/+2 | +2 | 0 | 2 |
| MPS | 4:00 | 515 | 154 | 160 | +1 | +4 | +1 | 0 |
| MPS | 4:00 | 515 | 153 | 157 | 0 | -1/+4 | -1 | 0 |
| LPPMIS | 4:00 | 515 | 124 | 140 | +1 | +2 | 0 | 7 |
| MPS | 4:00 | 515 | 154 | 158 | +1 | 0/+4 | -1 | 0 |
| MPS | 4:00 | 515 | 152 | 160 | +1 | +4 | +1 | 0 |
| MPS | 4:00 | 515 | 156 | 162 | +1 | 0/+4 | -1 | 0 |
| LPPMIS | 4:00 | 515 | 144 | 152 | +1 | +4 | -1 | 5 |
| MPS | 4:00 | 515 | 158 | 166 | +1 | +4 | 0 | 0 |
| MPS | 4:00 | 515 | 160 | 165 | +1 | +3 | 0 | 0 |
| LPPMIS | 4:00 | 515 | 148 | 157 | +1 | +3 | 0 | 5 |
| LPPMIS | 4:00 | 515 | 154 | 160 | +1 | +2 | 0 | 0 |

As seen, these pizzas that were baked in 4 minute belt

TABLE 3

| PRODUCT | BELT TIME | T° BAKE | T° MIN. | T° AVE. | CRUST | CHEESE | BOTTOM | DOUGH DONENESS |
|---|---|---|---|---|---|---|---|---|
| MPS | 4:40 | 520 | 176 | 185 | 0 | +2 | +1 | 0 |
| MPS | 4:40 | 520 | 176 | 180 | 0 | +2 | +1 | 0 |
| SPSS | 4:20 | 510 | 132 | 145 | 0 | +1 | 0 | 8 |
| SPSS | 4:20 | 510 | 138 | 150 | 0 | +1 | -1 | 8 |
| MPS | 4:20 | 510 | 159 | 163 | 0 | +1 | -1 | 0 |
| MPS | 4:20 | 510 | 158 | 165 | 0 | +2 | -1 | 0 |
| MPS | 4:20 | 510 | 152 | 163 | 0 | +1 | 0 | 0 |
| MPS | 4:20 | 510 | 162 | 168 | 0 | +1 | 0 | 0 |
| LPPMIS | 4:20 | 510 | 141 | 152 | 0 | 0 | 0 | 5 |
| SPPMIS | 4:20 | 510 | 148 | 152 | 0 | +1 | 0 | 0 |

TABLE 3-continued

| PRODUCT | BELT TIME | T° BAKE | T° MIN. | T° AVE. | CRUST | CHEESE | BOTTOM | DOUGH DONENESS |
| --- | --- | --- | --- | --- | --- | --- | --- | --- |
| LPPMIS | 4:00 | 520 | 138 | 150 | 0 | +1 | 0 | 6 |
| MPS | 4:00 | 510 | 148 | 158 | 0 | +1 | −1 | 0 |
| SPSS | 4:00 | 510 | 148 | 163 | 0 | 0 | +1 | 7 |
| SPSS | 4:00 | 510 | 138 | 142 | 0 | 0 | 0 | 7 |
| SPSS | 4:00 | 520 | 130 | 160 | 0 | +2 | 0 | 7 |

As in Example 2 above, the measured temperatures and dough doneness observations at 4 minute belt time and at 4 minutes and 20 second belt time, have led to the conclusion that this particular oven bakes best at minutes and 40 seconds.

Example 4 was carried out the same as Example 3 except that there were no air scoops or bottom curved plate in this oven. The modifications were limited to substituting the bigger fans and fan motors. The average measured velocities for the orifices in the top fingers for this oven was 6,600 fpm. The average measured velocities for the orifices in the bottom fingers was 5,400 fpm. and the average measured velocities for all of the orifices was 5,600 fpm. Some 11 standard PHI pizzas were cooked in this oven and rated as described above. The results for this oven are shown in Table 4 below.

TABLE 4

| PRODUCT | BELT TIME | T° BAKE | T° MIN. | T° AVE. | CRUST | CHEESE | BOTTOM | DOUGH DONENESS |
| --- | --- | --- | --- | --- | --- | --- | --- | --- |
| MPS | 5:00 | 520 | 154 | 162 | +1 | +2 | 0 | 0 |
| MPS | 5:00 | 520 | 158 | 162 | 0 | +1 | 0 | 0 |
| LPPMIS | 5:00 | 520 | 142 | 152 | 0 | +1 | 0 | 6 |
| MPS | 5:00 | 520 | 152 | 158 | +1 | +2 | +1 | 0 |
| LPSS | 5:00 | 520 | 148 | 155 | 0 | +1 | +1 | 1 |
| SPSS | 5:00 | 520 | 142 | 148 | +1 | +1 | +2 | 6 |
| MPS | 4:30 | 550 | 137 | 142 | 0 | 0 | +2 | 8 |
| MPS | 4:30 | 550 | 137 | 142 | 0 | 0 | +2 | 8 |
| LPPMIS | 4:00 | 530 | 122 | 130 | −2 | −1 | −1 | 8 |
| MPS | 4:00 | 530 | 125 | 135 | −2 | −1 | −2 | 8 |
| MPS | 4:00 | 550 | 142 | 149 | −2 | −1 | 0 | 8 |

Based on the internal temperatures and the dough doneness observations at 5, 4.5, and 4 minutes, this oven was deemed to bake best at 5 minutes and 30 seconds.

The data from these Examples is shown in the graph of FIG. 12. In particular, the acceptable bake time is marked on the vertical axis and the jet velocity of the orifices is marked on the horizontal axis. The triangles represent the values for the average orifice velocities for the top fingers. A solid line has been drawn to connect these points. The squares represent the values for the average orifice velocities for the bottom fingers. The circles represent the average velocities of all the orifices in each example. A dashed line has been drawn through these points.

The circle at the far left of the graph is the average orifice velocity for a Middleby Marshall Co. Model 350 impingement oven. The values for the top and bottom velocities were not available. This oven is a model marketed prior to the currently sold Model 360. PHI testing with this oven indicated an acceptable bake time of 8 minutes.

The values at 6.5 minutes are for the velocities measured on the standard Middleby Marshall Model PS 360.S described above. These values were measured with a glass mannomoter filled with water taking the place of the pressure differential cell. PHI testing, as well as experience in hundreds of PHI restaurants, has shown this oven to have an acceptable bake time of 6.5 minutes.

The values for Examples 1–4 are labeled on the graph. As can be seen, a sharp drop in the cook time was noted between Example 4 and Example 3. Accordingly, the preferred embodiment of the invention uses velocities above about 6,600 fpm.

It is also interesting to compare the values for Example 3 with those for Example 2. As can be seen, Example 2 had a lower overall average orifice velocity, even though Example 2 had a shorter acceptable bake time. This phenomenon is believed to be due to the fact that the average top finger orifice velocity was greater in Example 2 than in Example 3.

It should be noted that although much of the discussion has involved the modification of a commercially available impingement oven, the present invention is not limited thereto. For example, the requisite velocities for the jets of heated air may be attainable in other types of ovens. Also, although the discussion has dealt mostly with conveyor ovens, other types, such as turntable ovens, wherein a single pizza is rotated, are also within the scope of the invention. Certainly, these and all other modifications which are within the ordinary skill in the art to make are considered to lie within the scope of the invention as defined by the appended claims.

We claim:

1. In an oven for baking pizza comprising a conveyor for moving the pizza through a baking chamber of the oven; and at least one an fan for impelling heated air into a plenum; at least one top duct located above the conveyor which top duct includes an inlet which communicates with the plenum, and which top duct includes an array of orifices which form jets of the impelled heated air which jets impinge the top surface of the pizza; and at least one bottom duct located below the conveyor which includes an inlet which communicates with the plenum, and which bottom duct includes an array of orifices which form jets of the impelled heated air which jets are directed toward the bottom surface of the pizza; the improvement comprising:

an air scoop attached in the plenum adjacent to the inlet of the top duct, said scoop having a concave and continuous curved surface for contacting heated air and directing it into the top duct;

detection means for detecting movement of a pizza toward the baking chamber;

signal generating means for generating a signal in response to detection by the detection means;

timer means for measuring a time period sufficient for the pizza to travel through the baking chamber; and fan control means for increasing the rotational speed of the an during the time period measured by the timer means and thereafter decreasing the rotational speed of the fan to an idling speed.

2. In an oven for baking pizza comprising a conveyor for moving the pizza through a baking chamber of the oven; and at least one fan for impelling heated air into a plenum; at least one top duct located above the conveyor which top duct includes an inlet which communicates with the plenum, and which top duct includes an array of orifices which form jets of the impelled heated air which jets impinge the top surface of the pizza; and at least one bottom duct located below the conveyor which includes an inlet which communicates with the plenum, and which bottom duct includes an array of orifices which form jets of the impelled heated air which jets are directed toward the bottom surface of the pizza; the improvement comprising:

detection means for detecting movement of a pizza toward the baking chamber;

signal generating means for generating a signal in response to detection by the detection means;

timer means for measuring a time period sufficient for the pizza to travel through the baking chamber; and fan control means for increasing the rotational speed of the fan during the time period measured by the timer means and thereafter decreasing the rotational speed of the fan to an idling speed.

3. In an oven for baking pizza comprising a conveyor for moving the pizza through a baking chamber of the oven; and at least one fan for impelling heated air into a plenum; at least one top duct located above the conveyor which top duct includes an inlet which communicates with the plenum, and which top duct includes an array of orifices which form jets of the impelled heated air which jets impinge the top surface of the pizza; and at least one bottom duct located below the conveyor which includes an inlet which communicates with the plenum, and which bottom duct includes an array of orifices which form jets of the impelled heated air which jets are directed toward the bottom surface of the pizza; the improvement comprising:

an air scoop attached in the plenum adjacent to the inlet of the top duct, said scoop having a curved surface for directing heated air into the top duct;

detection means for detecting movement of a pizza toward the baking chamber;

signal generating means for generating a signal in response to detection by the detection means;

timer means for measuring a time period sufficient for the pizza to travel through the baking chamber; and fan control means for increasing the rotational speed of the fan during the time period measured by the timer means and thereafter decreasing the rotational speed of the fan to an idling speed.

4. In an oven for baking pizza comprising a conveyor for moving the pizza through a baking chamber of the oven; and at least one fan mounted in a top portion of the oven for impelling heated air downward into and through a plenum, which plenum communicates with at least one top duct located above the conveyor, which top duct includes an array of orifices which form jets of the impelled heated air which jets impinge the top surface of the pizza; and at least one bottom duct located below the conveyor which communicates with the plenum, and which bottom duct includes an array of orifices which form jets of the impelled heated air which jets are directed toward the bottom surface of the pizza; the improvement comprising:

an air scoop attached to the plenum to form a portion of an inlet pathway for the top duct, said scoop having a curved surface for directing a portion of the downward flow of heated air from the plenum into the top duct.

5. In an oven for baking pizza comprising a conveyor for moving the pizza through a baking chamber of the oven; and at least one fan mounted in a top portion of the oven for impelling heated air downward into and through a plenum, which plenum communicates with at least one top duct located above the conveyor, which top duct includes an array of orifices which form jets of the impelled heated air which jets impinge the top surface of the pizza; and at least one bottom duct located below the conveyor which communicates with the plenum, and which bottom duct includes an array of orifices which form jets of the impelled heated air which jets are directed toward the bottom surface of the pizza; the improvement comprising:

a convex plate attached to the plenum to form a portion of an inlet pathway for the bottom duct, said convex plate having a curved surface for directing the downward flow of heated air into the bottom duct.

6. An oven for baking pizza comprising:

a fan for impelling hot air attached to an upper portion of the oven, said fan blowing said hot air downward through a plenum;

a conveyor for moving the pizza through a baking chamber formed in a central portion of the oven;

a top duct attached to an inner surface of an inner side wall of said plenum and communicating through an inlet opening with said plenum, said top duct extending above said conveyer and below said fan, and said top duct having an array of orifices formed therein which form jets of the impelled heated air which jets impinge the top surface of the pizza; and a concave scoop attached at a first end to an outer surface of the inner side wall of the plenum adjacent to and below the inlet opening for directing a portion of the downward flowing air through the inlet opening of the top duct;

a bottom duct attached to the inner surface of the inner side wall of the plenum and communicating through an inlet opening with said plenum, said bottom duct extending below said conveyer and having an array of orifices formed therein which form jets of the impelled heated air which jets are directed toward the bottom surface of the pizza.

7. The oven of claim 6 further comprising:

a plate attached at a top end to a second end of the scoop, said plate extending downward through said plenum, said plate having a convex curved lower end attached to the inner surface of the inner wall of the plenum adjacent to and above the inlet opening of the bottom duct.

8. The oven of claim 7 further comprising:

detection means for detecting movement of a pizza toward the baking chamber;

signal generating means for generating a signal in response to detection by the detection means;

timer means for measuring a time period sufficient for the pizza to travel through the baking chamber; and fan control means for increasing the rotational speed of the fan during the time period measured by the timer means and thereafter decreasing the rotational speed of the fan to an idling speed.

9. An oven for baking pizza comprising:

a fan for impelling hot air attached to an upper portion of the oven, said fan blowing said hot air downward through a plenum;

a conveyor for moving the pizza through a baking chamber formed in a central portion of the oven;

a top duct attached to an inner surface of an inner side wall of said plenum and communicating through an inlet opening with said plenum, said top duct extending above said conveyer and below said fan, and said top duct having an array of orifices formed therein which form jets of the impelled heated air which jets impinge the top surface of the pizza;

a bottom duct attached to the inner surface of the inner side wall of the plenum and communicating through an inlet opening with said plenum, said bottom duct extending below said conveyer and having an array of orifices formed therein which form jets of the impelled heated air which jets are directed toward the bottom surface of the pizza.

a convex curved plate attached to the inner surface of the inner wall of the plenum adjacent to and above the inlet opening of the bottom duct.

10. An oven for baking pizza comprising:

a fan mounted to a top portion of the oven for blowing heated air downward through a plenum, said plenum having a first opening formed in a generally vertical inner side wall for communicating with a top duct, said plenum having a second opening formed below said first opening on said inner wall for communicating with a bottom duct; and a scoop attached to said inner wall adjacent to and below said first opening for directing a portion of the heated air flowing downward through the plenum into said top duct, said top duct extending generally horizontally over a conveyer which carries pizza through the oven, said top duct having an array of orifices formed therein which form jets of the impelled heated air, which jets impinge the top surface of the pizza.

11. The oven of claim 10 further comprising:

a convex curved plate attached to said inner wall adjacent and above said second opening.

12. The oven of claim 11 wherein said convex curved plate has an extended upper portion for attaching to an upper end of the scoop.

13. The oven of claim 12 wherein the scoop and curved plate are formed as a unitary member.

14. The oven of claim 10 further comprising a curved plate formed adjacent to and above said second opening for reducing turbulence.

* * * * *

UNITED STATES PATENT AND TRADEMARK OFFICE
CERTIFICATE OF CORRECTION

PATENT NO. : 5,454,295
DATED : October 3, 1995
INVENTOR(S) : Thomas L. Cox et al.

It is certified that error appears in the above-indentified patent and that said Letters Patent is hereby corrected as shown below:

<u>In the Claims</u>

Column 16, line 56, delete "an" and substitute --fan--.

Column 17, line 11, delete "an" and substitute --fan--.

Signed and Sealed this

Twelfth Day of November, 1996

Attest:

BRUCE LEHMAN

*Attesting Officer*    *Commissioner of Patents and Trademarks*